United States Patent [19]

Grube et al.

[11] Patent Number: 5,319,796

[45] Date of Patent: Jun. 7, 1994

[54] COMMUNICATION SYSTEM THAT AVOIDS CO-CHANNEL INTERFERENCE

[75] Inventors: Gary W. Grube, Palatine; Edward T. Leisten, Barrington; Michael J. Bonvallet, Algonquin, all of Ill.

[73] Assignee: Motorola, Inc., Schaumburg, Ill.

[21] Appl. No.: 626,666

[22] Filed: Dec. 14, 1990

[51] Int. Cl.$^5$ ............................ H04B 7/26; H04Q 7/02
[52] U.S. Cl. .................... 455/33.4; 455/34.1; 455/56.1; 455/63
[58] Field of Search ............... 455/33.2, 33.4, 67.3, 455/50.1, 56.1, 63, 62, 33.1, 34.1; 379/60

[56] References Cited

U.S. PATENT DOCUMENTS

| | | | |
|---|---|---|---|
| 4,025,853 | 5/1977 | Addeo | 325/55 |
| 4,578,815 | 3/1986 | Persinotti | 455/15 |
| 4,612,415 | 9/1986 | Zdunek et al. | 455/33 |
| 4,799,253 | 1/1989 | Stern et al. | 455/33.2 |
| 4,831,373 | 5/1989 | Hess | 455/33 |
| 5,040,238 | 8/1991 | Comroe et al. | 455/33.4 |
| 5,047,762 | 9/1991 | Bruckert | 455/33.4 |
| 5,093,927 | 3/1992 | Shanley | 455/62 |
| 5,095,529 | 3/1992 | Comroe et al. | 455/34.1 |
| 5,148,548 | 9/1992 | Meche et al. | 455/34.1 |

Primary Examiner—Reinhard J. Eisenzopf
Assistant Examiner—Chi Pham
Attorney, Agent, or Firm—Susan L. Lukasik; Steven G. Parmelee

[57] ABSTRACT

Co-channel user (129) interference on trunked radio communication systems cannot be compensated for in the same way as conventional radio systems because the communication unit does not know what frequency it will be assigned to until it begins transmitting. Placing an additional receiver (119) in the coverage area (125) of the co-channel user (129) and sending information of recent co-channel usage to the controller (101) allows the controller (101) to decide which channel has the least likelihood of co-channel interference so that it may be assigned.

18 Claims, 4 Drawing Sheets

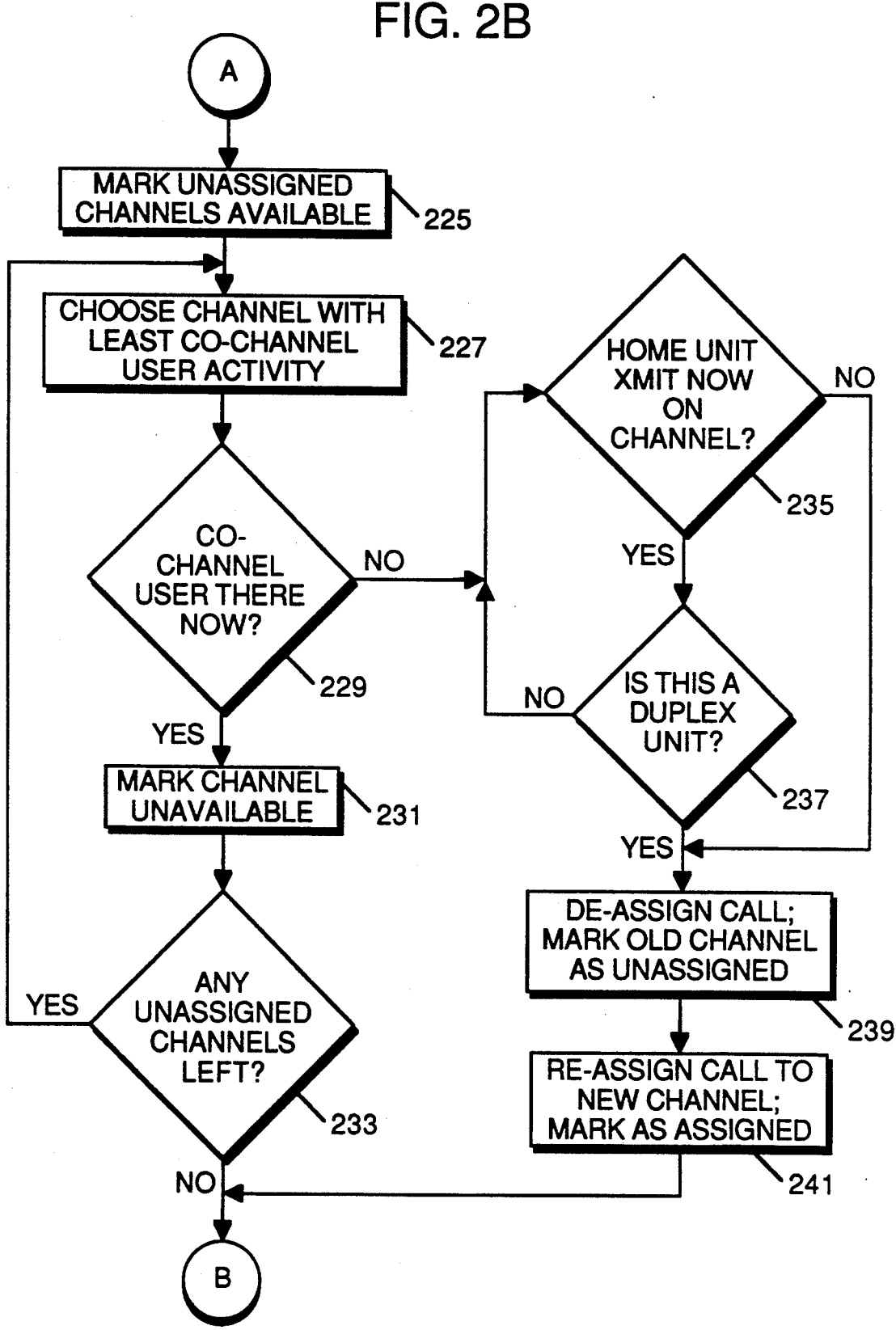

COMMUNICATION SYSTEM THAT AVOIDS CO-CHANNEL INTERFERENCE

FIELD OF THE INVENTION

This invention relates to trunked radio systems. More particularly, this invention relates to channel assignment in trunked radio systems.

BACKGROUND OF THE INVENTION

Channel assignment decisions in trunked communication systems are carried out by a central controller in response to channel requests from a plurality of communication units. At times, these trunked systems are installed in geographic proximity with other users of the same channels. This produces some undesired co-channel interference for both parties. These co-channel users can be using another trunked system or a conventional system.

Conventional radio systems add special signalling, such as sub-audible tone modulation on the carrier, to avoid being bothered with other user's traffic. Turning off this feature before transmitting to avoid interference is quite common. This enables the receiving speaker to hear any current user on the channel. If no one is active, the operator can then transmit with little risk of interference. This method of manual interference avoidance is very common. Similarly, some conventional radio units provide an option that automatically inhibits transmission if a signal is present at the receiver.

This method of monitoring the communication channel for co-channel users prior to transmission cannot be readily applied to a trunking system since the communication units never know which channel resource (a voice or data channel) they will be assigned. Because the system central controller decides which resource to assign, it is logical that interference avoidance in a trunked system could be performed in the central controller. The centralized interference avoidance method today involves looking for activity on the inbound voice channels at the base station receiver. Since channels in trunked systems are made up of the same frequency pair (one channel for inbound messages to the base station, one channel for outbound messages from the base station), detecting an inbound signal usually meant that the outbound frequency is active as well. However, many systems use wireline dispatch centers which do not use the inbound channel to make an outbound call, hence dispatcher co-channel users cannot be detected with this method.

The present method of signal detection starts a timer as soon as a simple carrier is detected (above a preset signal level threshold) on one of the inbound voice channels. The timer continues to run as long as the carrier remains present. A break in the carrier resets and turns off the timer. When the timer expires, i.e. reaches a predetermined value, say, 50 seconds, the channel is considered to have undesired interference and is taken out of service for a period of time, such as 5 minutes. This carrier detection method is best suited to detect the class of interference called intermodulation (IM), which is very common at the more congested antenna sites. It is not suited to instantaneously and reliably detect the presence of a true co-channel user.

Accordingly, there is a need for a method of co-channel interference detection that can instantaneously and reliably detect co-channel users, especially dispatcher co-channel users, on both inbound and outbound frequencies.

BRIEF DESCRIPTION OF THE DRAWINGS

FIG. 2A and FIG. 2B form a flowchart showing interference avoidance performed by the central controller in accordance with the invention.

DESCRIPTION OF A PREFERRED EMBODIMENT

The following describes a method and apparatus for interference avoidance that detects co-channel interference on both the inbound and outbound frequencies in a reliable and substantially instantaneous way.

Figure 1A:
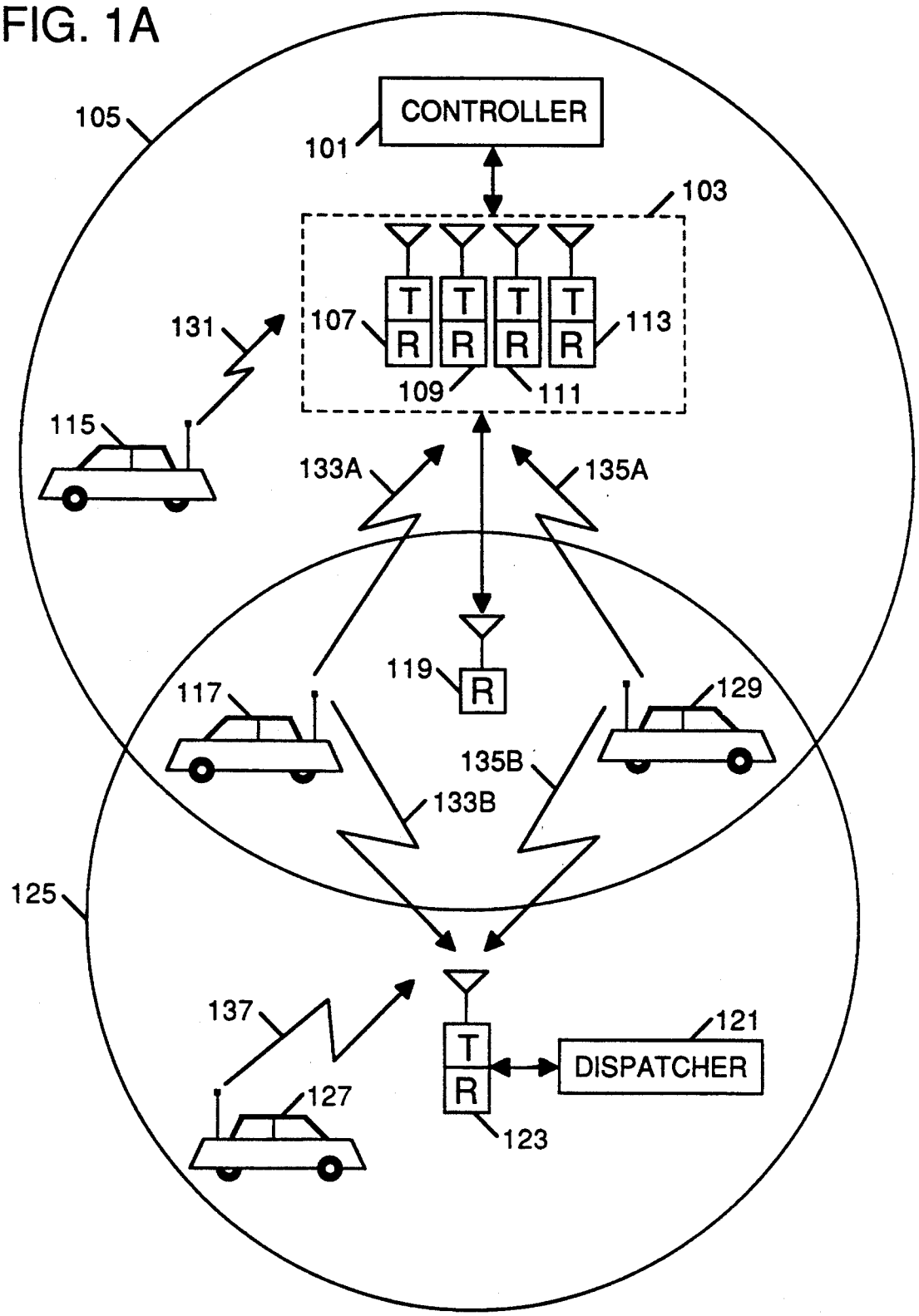
FIG. 1A is a diagram of two communication systems interfering with each other on an inbound call in accordance with the invention.
Figure 1B:
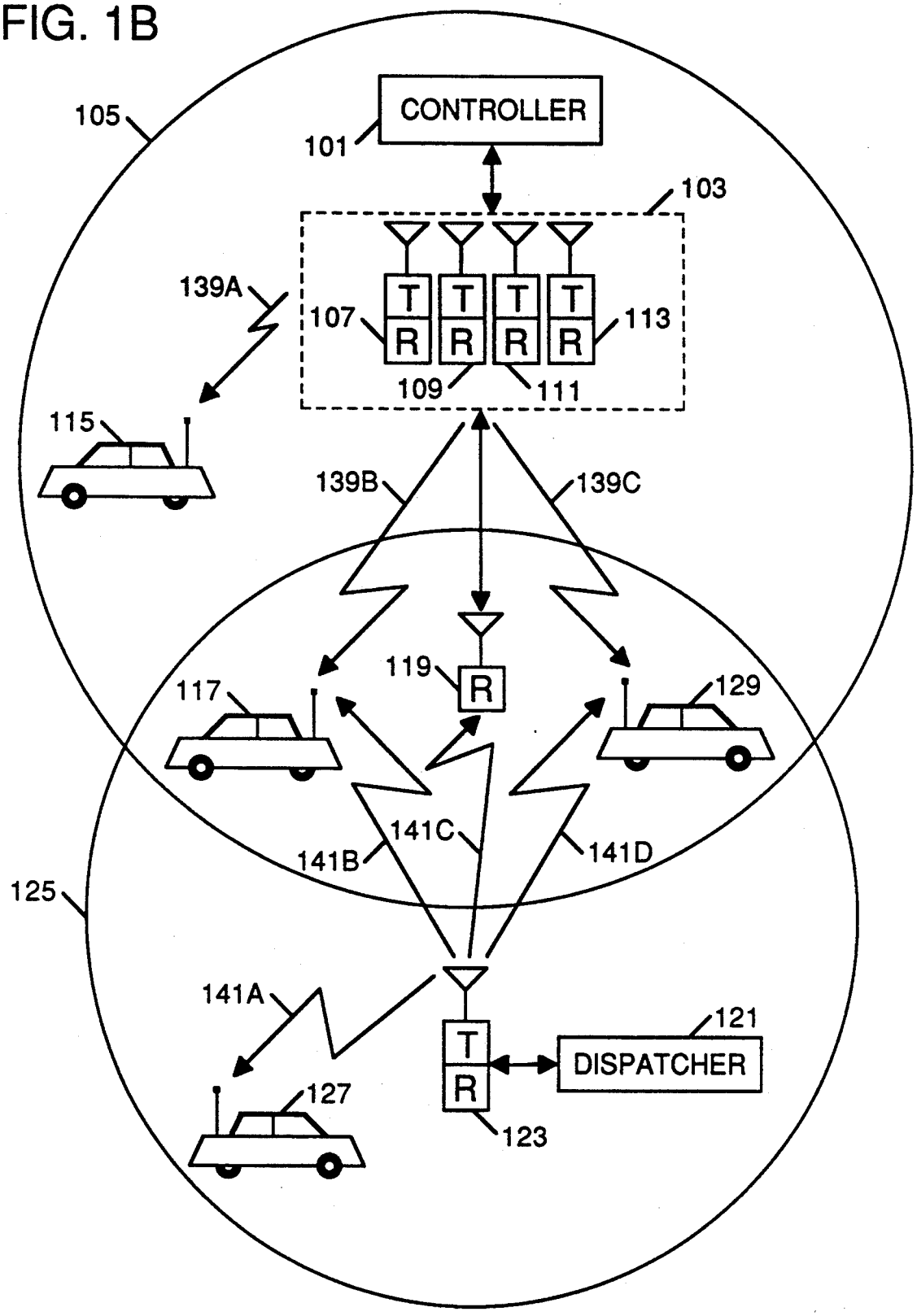
FIG. 1B is a diagram of two communication systems interfering with each other on an outbound call in accordance with the invention.

In the invention, an additional receiver is placed in the coverage area of the co-channel user's system. This receiver is tuned to the transmitting frequency of the base station(s), enabling it to detect outbound messages. These messages are identified by type and the information is passed from the receiver to the central controller or equivalent circuitry in the trunked system. The (central) controller keeps data on all detected co-channel messages, and based on that data, assigns channels with the least amount of recent co-channel usage. The central controller can either be a separate box, such as a Smartnet TM Controller, available from Motorola, Inc., or a distributed intelligence among the base stations. FIG. 1A and FIG. 1B are diagrams of two communication systems engaged in calls causing interference with each other in accordance with the invention. The first system, a trunked radio system, is comprised of a controller 101, a base station site 103 controlled by the controller 101, and two mobile trunked communication units 115, 117 within the coverage area 105 of the system. There are four base stations 107, 109, 111, 113 at the base station site 103. The fourth base station 113 transmits on frequency A and receives on frequency B. The controller 101 has currently assigned the channel resources of the fourth base station to the two mobiles 115, 117, which transmit on frequency B and receive on frequency A (only one of the two mobiles 115, 117 transmits at one time). The second system has one base station repeater 123, a wireline dispatcher 121, and two mobile communication units 127, 129 within the coverage area 125 of the system. The base station 123 of this second system, like the fourth base station 113 of the first system, transmits on frequency A and receives on frequency B. The two mobiles 127, 129 transmit on frequency B and receive on frequency A and are also engaged in a conversation. Because the two coverage areas 105, 125 overlap in the area where two mobiles 117, 129 are currently travelling, and both systems have the same channel resource, there will be interference if both systems utilize that channel at the same time.

The interference caused during the inbound call is shown in FIG. 1A. The same transmission with its different paths is designated by one numeral and a different letter for each path, such as 133A and 133B. Because mobile 117 of the first system is within the coverage area of both systems, its inbound transmission 133A to the fourth base station 113, also reaches the base station 123 of the second system via another path 133B. Similarly, mobile 129 sends an inbound transmission 135B which also reaches base station 113 of the first system via another path 135A. Interference exists in the first system at the fourth base station 113 from these two transmissions 133A, 135A, and interference exists in the second system at the base station 123 from these two transmissions 133B, 135B. Interference also occurs if mobiles 117 and 127 transmit simultaneously, thus transmissions 133B and 137 interfere at the base station 123; and mobiles 115 and 129 transmitting simultaneously result in transmissions 131 and 135A interfering at the base station 113.

The interference caused during the outbound call is shown in FIG. 1B. The two base stations 113, 123 using the same frequency pair transmitting simultaneously cause interference at the two mobiles 117, 129 in the overlap area. Transmissions 139B and 141B interfere at mobile 117, and transmissions 139C and 141D interfere at mobile 129.

To detect co-channel users, an additional receiver 119 (shown in FIG. 1A and FIG. 1B) is placed within the coverage area of the co-channel user. This receiver 119 is set to (at least) the transmitting frequency of the base station in the co-channel user's system. Each time the receiver 119 receives a message, the signal is identified. Each signal has its own signature that identifies it by type. For example, trunked communications may use a sub-audible 100 Hz tone at 800 Hz deviation, secure communications use 12 kbps binary signalling, data communications operate at 4.8, 9.6 and 19.2 kbps, to name a few. Looking for these signatures allows for quick and reliable recognition of the co-channel user. The receiver can also monitor the co-channel user's control channel, if that system is trunked, to avoid assigning a channel that is assigned by the other system. The information received by the receiver 119 is passed to the controller 101, either through a wireline connection or over the designated control channel, which records the information and keeps a record of recent channel usage. This allows the controller 101 to assign the channel resources (voice/data channels, TDM slots, etc.) based on the least amount of recent usage, thus avoiding interference. If a co-channel user begins transmitting during an assigned call, the controller 101 may move the call to another channel to avoid further interference, and the next channel is chosen as the channel with the least amount of recent co-channel usage.

Additional receivers or receiver capability should be placed for each channel experiencing co-channel interference. Better results are achieved when these receivers are placed in the coverage area of the co-channel user's system. If the receivers at the base station site are used, co-channel information is not as accurate because the base stations are typically out of the range of the co-channel user's coverage area.

Figure 2A:
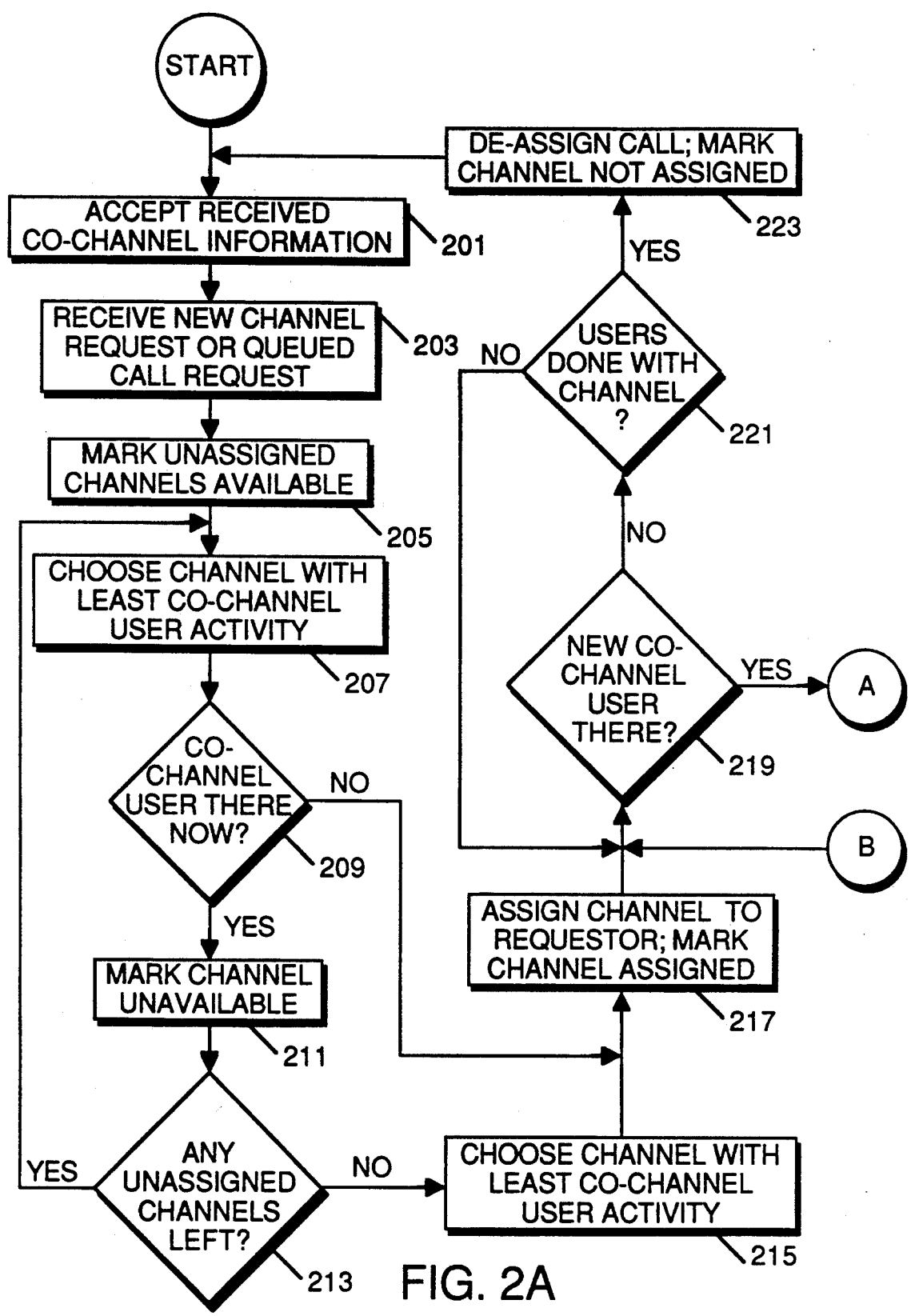

FIG. 2A and FIG. 2B form a flowchart showing interference avoidance as performed by the controller. The controller accepts received co-channel information at step 201. When a new channel request or queued call request is received at step 203, all unassigned channels are marked as available at step 205. At step 207, the controller chooses the unassigned and available channel with the least amount of recent co-channel user activity. If there is a co-channel user on this channel at the present time at step 209, the channel is marked unavailable at step 211. If any unassigned channels are left at step 213, the process continues with step 207. If there are no unassigned channels left at step 213, the unassigned channel with the least amount of recent co-channel user activity is chosen at step 215, and the process continues with step 217. If there is no current co-channel user on the chosen channel at step 209, this channel is assigned to the requester and is marked as assigned at step 217. If at step 219 there is no new co-channel user on the assigned channel and the users are done with the channel at step 221, the call is de-assigned, and the channel is marked not assigned at step 223, and the process continues with step 201. If at step 221 the users are not done with the channel, the process continues with step 219. If at step 219 there is a new co-channel user, all unassigned channels are marked as available at step 225. The unassigned and available channel with the least amount of recent co-channel user activity is chosen at step 227. If at step 229 there is a co-channel user at this channel at the present time, the channel is marked unavailable at step 231. If any unassigned channels are left at step 233, the process continues with step 227. If there are no unassigned channels left at step 233, the process continues with step 219. If there is no current co-channel user on the chosen channel at step 229, the process continues with step 235. If at step 235 the home unit is currently transmitting on the channel and the unit is a full duplex unit at step 237, the call is de-assigned and the old channel is marked as unassigned at step 239, after which this call is reassigned to the new channel which is marked as assigned at step 241, and the process continues with step 219. If at step 235 the home unit is currently transmitting on the channel and the unit is not a full duplex unit at step 237, the process continues with step 235. If at step 235 the home unit is not currently transmitting on the channel, the process continues with step 239.

What is claimed is:

1. A trunked radio communication system that avoids co-channel interference, having at least two channel resources and at least two communication units, and also having a coverage area overlapping the coverage area of at least one other communication system, wherein the at least one other communication system is independent from the trunked radio communication system in that the at least one other communication system is under separate and distinct control with respect to the trunked radio communication system, with at least one channel resource in common between the systems, comprising:

means for receiving transmitted signals from the at least one other communication system on the at least one common channel resource;

means, coupled to said means for receiving, for recording history of usage of the at least one common channel resource; and means, operatively coupled to said means for recording, for assigning one of said at least two channel resources to at least one of the at least two communication units so as to avoid interference with the at least one common channel resource.

2. The communication system of claim 1 wherein said means for receiving further comprises means for receiving placed within the overlapping coverage area.

3. The communication system of claim 2 wherein said means for receiving further comprises means for coupling said means for receiving to the trunked radio communication system with a non-radio connection.

4. The communication system of claim 2 wherein said means for receiving is operably coupled to the trunked radio communication system with one of the at least two channel resources.

5. The communication system of claim 1 wherein said means for receiving further comprises means for receiving both frequencies of a duplex channel.

6. The communication system of claim 1 wherein said means for assigning further comprises selecting the channel resource with the least amount of recorded history of usage.

7. The communication system of claim 1 wherein said means for assigning further comprises reassigning said at least one of the at least two communication units to another channel resource upon detection of subsequent activity on said assigned said at least one channel resource.

8. A method of co-channel interference avoidance in a trunked radio communication system having at least two channel resources and at least two communication units, and also having a coverage area overlapping the coverage area of at least one other communication system, wherein the at least one other communication system is independent from the trunked radio communication system in that the at least one other communication system is under separate and distinct control with respect to the trunked radio communication system, with at least one channel resource in common between the systems, comprising the steps of:
   receiving transmitted signals from the at least one other communication system on the at least one common channel resource;
   recording, responsive to said step of receiving, history of usage of the at least one common channel resource; and
   assigning, responsive to said step of recording, one of said at least two channel resources to at least one of the at least two communication units so as to avoid interference with the at least one common channel resource.

9. The method of co-channel interference avoidance of claim 8 wherein said step of receiving further comprises the step of receiving within the overlapping coverage area.

10. The method of co-channel interference avoidance of claim 8 wherein said step of receiving further comprises the step of receiving both frequencies of a duplex channel.

11. The method of co-channel interference avoidance of claim 8 wherein said step of assigning further comprises the step of selecting the channel resource with the least amount of recorded history of usage.

12. The method of co-channel interference avoidance of claim 8 wherein said step of assigning further comprises the step of reassigning said at least one of the at least two communication units to another channel resource upon detection of subsequent activity on said assigned said at least one channel resource.

13. A controller in a trunked radio communication system that avoids co-channel interference, having at least two channel resources and at least two communication units, and also having a coverage area overlapping the coverage area of at least one other communication system, wherein the at least one other communication system is independent from the trunked radio communication system in that the at least one other communication system is under separate and distinct control with respect to the controller in the trunked radio communication system, with at least one channel resource in common between the systems, the controller comprising:
   means for accepting received information on transmitted signals from the at least one other communication system on the at least one common channel resource;
   means, coupled to said means for receiving, for recording history of usage of the at least one common channel resource; and
   means, operatively coupled to said means for recording, for assigning one of said at least two channel resources to at least one of the at least two communication units so as to avoid interference with the at least one common channel resource.

14. The means for central controlling of claim 13 wherein said means for assigning further comprises selecting the channel resource with the least amount of recorded history of usage.

15. The communication system of claim 13 wherein said means for assigning further comprises reassigning said at least one of the at least two communication units to another channel resource upon detection of subsequent activity on said assigned said at least one channel resource.

16. A method of central controlling in a trunked radio communication system that avoids co-channel interference, having at least two channel resources and at least two communication units, and also having a coverage area overlapping the coverage area of at least one other communication system, wherein the at least one other communication system is independent from the trunked radio communication system in that the at least one other communication system is under separate and distinct control with respect to the trunked radio communication system, with at least one channel resource in common between the systems, comprising the steps of:
   accepting received information on transmitted signals from the at least one other communication system on the at least one common channel resource;
   recording, responsive to said step of receiving, history of usage of the at least one common channel resource; and
   assigning, responsive to said step of recording, one of said at least two channel resources to at least one of the at least two communication units so as to avoid interference with the at least one common channel resource.

17. The method of central controlling of claim 16 wherein said step of assigning further comprises the step of selecting the channel resource with the least amount of recorded history of usage.

18. The communication system of claim 16 wherein said step of assigning further comprises the step of reassigning said at least one of the at least two communication units to another channel resource upon detection of subsequent activity on said assigned said at least one channel resource.

* * * * *